United States Patent [19]

Walker et al.

[11] 4,236,479
[45] Dec. 2, 1980

[54] HEADLIGHTS REMINDER

[76] Inventors: Lila A. Walker; Richard A. Walker; Craig A. Walker, all of 17966 Sencillo La., San Diego, Calif. 92128

[21] Appl. No.: 21,471

[22] Filed: Mar. 19, 1979

[51] Int. Cl.³ .......................... B60Q 9/00; G01D 3/08
[52] U.S. Cl. ................................. 116/28 R; 116/200; 116/205; 116/306; 116/307
[58] Field of Search ...................... 116/205, 28 R, 200, 116/306, 307, DIG. 1, DIG. 17, 325, 277; 200/308; 40/10 A, 10 B, 593

[56] References Cited

U.S. PATENT DOCUMENTS

| 1,276,735 | 8/1918 | Devney | 40/331 |
| 2,305,426 | 12/1942 | Howell | 40/331 |
| 2,604,066 | 7/1952 | Salmon | 116/200 |
| 3,237,330 | 3/1966 | Dinstbir | 116/28 R |
| 3,472,198 | 10/1969 | Rinecker | 116/200 |

Primary Examiner—Gerald Goldberg
Assistant Examiner—Denis E. Corr
Attorney, Agent, or Firm—Henri J. A. Charmasson

[57] ABSTRACT

A device for reminding an automobilist to turn off the headlights before exiting the automobile which comprises a plug removably attached to the headlight control knob and means for removably attaching the same plug at a point near the door handle whereby the automobilist will be reminded to remove the plug from the headlight knob when operating the knob and to attach the plug to the door handle where it will be sensed when the automobilist grasps the handle in order to open the door.

5 Claims, 6 Drawing Figures

HEADLIGHTS REMINDER

BACKGROUND OF THE INVENTION

Every automobilist has at one time experienced the frustration of being unable to start a car engine after the car battery has been run down by reason of his forgetting to turn off the headlights when he last used the automobile. Most cars are provided with visual indicators that the headlights are on. Unfortunately, this type of indicator is barely visible in areas of high illumination or when daylight comes after a night or early morning drive. There is therefore a need for a device that would positively indicate to an automobilist about to exit his car that the headlights have been left on.

SUMMARY OF THE INVENTION

The principal object of this invention is to provide an automobilist with a signal that he must turn off his headlights before exiting his vehicle.

Another object of this invention is to provide a headlight turnoff reminding device which cannot be easily ignored by the automobilist about to exit his vehicle.

A further object of the invention is to provide such a device in a attractive, but noticeable configuration compatible with the automobile interior decor.

This and other objects are achieved by a decorative plug which is removably fastened to the surface of the headlight's knob, and which can also be similarly attached to or near the door handle.

DESCRIPTION OF THE PREFERRED EMBODIMENT OF THE INVENTION

Figure 1:
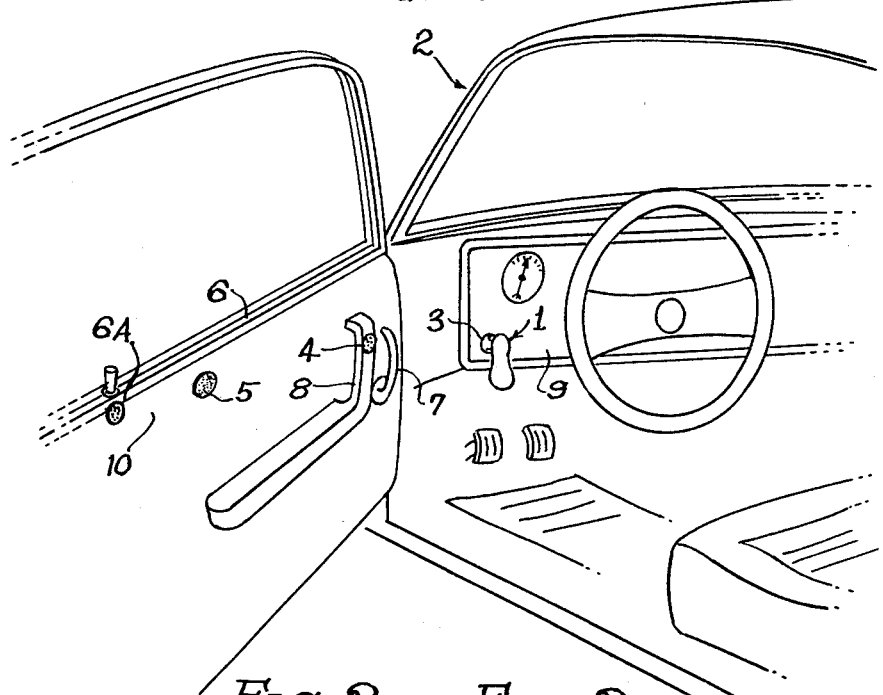
FIG. 1 is a partial view of an automobile interior seen through the driver's open door, left or right, illustrating the use of the headlights turnoff reminder.
Figure 2:
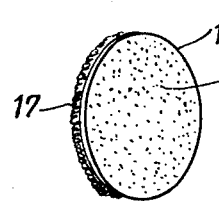
FIG. 2 is a perspective view of a sticker chip having a loop-type fastening surface.
Figure 3:
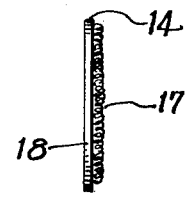
FIG. 3 is a side view thereof.
Figure 4:
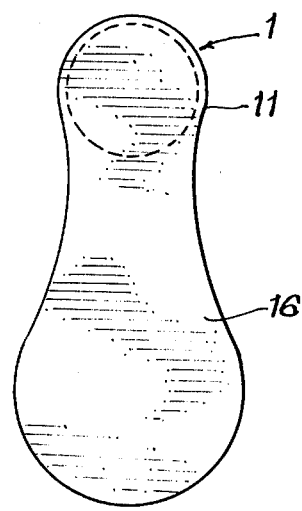
FIG. 4 is a front elevational view of a attachment tag.
Figure 5:
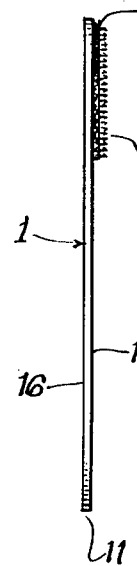
FIG. 5 is a left side view thereof.
Figure 6:
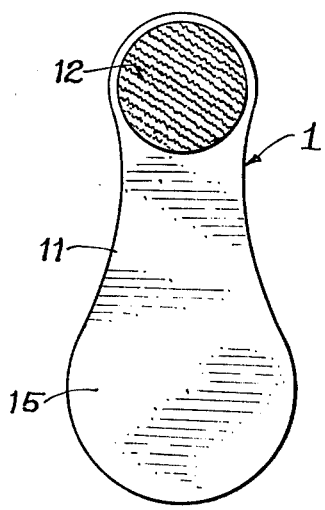
FIG. 6 is a back view thereof.

Referring now to the drawing and according to the invention there is illustrated a device for reminding an automobilist to turn off the headlights before exiting the vehicle. An attachment tag 1 made of soft plastic material has glued to its back surface 15 a stick-on chip 12 having Velcro ® (hook-type) material such as is sold under the trademark Velcoin ®. On the dash panel 9 of an automobile 2 the headlight control knob 3 has affixed to its face a stick-on chip 14 of Velcro ® "loop-type" material with glue or pressure sensitive adhesive, whereby the attachment tag 1 can be affixed against the headlight control knob 3 face by pressing the two Velcro ® chips together. A second Velcro ® "loop-type" stick-on chip 4 is affixed to an appropriate surface of the surface interior of the driver's door 8 near that door's handle 7 to receive the tag 1 in its reminding position. A third Velcro ® loop-type stick-on 5 is affixed the driver's inside door panel 10 near the edge 6 of the side window, near the door lock 6A or any other location an individual driver normally has cause to notice when exiting the automobile. When the headlights are not in use the attachment tag 1 is kept mounted against the face of the headlight control knob 3. The driver will not be able to turn on the headlights without touching the attachment tag 1. Before pulling the headlights knob, the driver by the attachment tag's presence there, is reminded to remove the attachment tag 1 and transfer it to either the door handle stick-on position 4 or to any other location 5 or 6A he has selected for the third chip. In either case, the attachment tag 1 will remind the automobilist that his headlights are on when he is about to exit the vehicle. If the attachment tax 1 is affixed to the interior surface of stick-on position 4, the tag will be felt when the driver's hand reaches for the door handle 7. This unnatural presence of the attachment tag 1 will remind him that the headlight knob must be pushed in (or down), The driver should then turn off the headlights and transfer the attachment tag 1 back to the headlights knob 3. If the attachment tag 1 has been affixed to the panel stick-on position 5, it will be clearly visible to the driver when he attempts to exit the vehicle 2. Similarly, the attachment tag 1 will interfer with the driver's operation of the interior lock batten if the third chip is affixed at that position 6A. The panel stick-on position 5 acts as a display station for the attachment tag 1 which the driver has to look at when he exits the vehicle 2. The effectiveness of the device may be enhanced by writing an appropriate message on the front face 16 of the attachment tag. Bright or fluorescent paint may also be used so that the attachment tag 1 will be more easily noticed in the dark. Obviously, when the headlights are on, the attachment tag 1 could be transferred to other means for controlling the operation of the vehicle 2 such as the hand brake or the gear shift control which must be operated before leaving the vehicle. The windshield or the side window could also be used as alternate conspicuous display station for the attachment tag 1. The shape and size of the attachment tag 1 could of course be varied according to the taste and preference of the automobile owner or in order to match the interior decor of the vehicle. Although I have described my invention in conjunction with the operation of an automobile, it can easily be understood that this invention could be applied to any other implement in which sequential actuation of two different control means must be respected. While I have described the preferred embodiment of my invention and suggested modifications thereto, changes may be made in the implementation and application without departing from the spirit of the invention or the scope of the appended claims.

The invention claimed is:

1. In a driver operated automotive vehicle having a manually operated control means for switching headlights on and off and a manually operated control means for opening the driver side exit door of said vehicle, a device for reminding the driver of the status of said means for switching when said driver attempts to operate said means for opening which comprises:

an attachment fastenable to the exposed surface of said means for switching said attachment being dimensioned and positioned so that said driver cannot actuate said means for switching without touching the attachment, and first means for fastening the attachment to said exposed surface comprising:

a first interlocking element bonded to one side of the attachment;

a second interlocking element cooperating with said first interlocking element to create a manually brekable interconnection, said second element being bonded to said exposed surface; and second means for fastening the attachment to or near said means for opening positioned and dimensioned so that the driver cannot actuate said means for opening without touching the attachment, said second means comprising:

a third interlocking element of the same type as the second interlocking element, said third element being bonded to or near said means for opening and cooperating with said first interlocking element to create a manually breakable interconnection.

2. In a driver operated automotive vehicle having a manually operated control means for switching headlights on and off and an exit door near said driver's seat, a device for reminding the driver of the status of the control means which comprises:

an attachment fastenable to the exposed surface of the control means, said attachment being dimensioned and positioned so that the driver cannot manually operate the control means without touching the attachment;

means for fastening the attachment to the control means comprising a first interlocking element bonded to one side of the attachment, and a second interlocking element cooperating with said first interlocking element, said second interlocking element being bonded to said exposed surface; and means for fastening the attachment to the inside surface of said door comprising a third interlocking element of the same type as the second interlocking element, said third element being bonded to the inside surface of said door and cooperating with said first interlocking element to create a manually breakable bond.

3. The device claimed in claim 1 or claim 2 wherein said attachment comprises a tag, and said first interlocking element comprises a piece of fabric having a back surface bonded to the back of the tag and a front surface defining a plurality of upstanding hooking elements of flexible resilient material.

4. The device claimed in claim 3 wherein said second and third interlocking elements comprise a piece of fabric having a front surface defining a plurality of complimentary looping elements of resilient material and a back surface bondable to said first or to said second control means or to said station cooperating with said first interlocking element to form a breakable bond.

5. The device claimed in claim 4 wherein said tag is made of heavy gauge, soft plastic or other suitable materials in a plurality of shapes and/or decoration.

* * * * *